United States Patent [19]
Lapchak et al.

[11] 4,082,449
[45] Apr. 4, 1978

[54] LATENSIFYING APPARATUS

[75] Inventors: Markian Lapchak, Denver; Henry H. Curtis, Jr., Sedalia, both of Colo.

[73] Assignee: Honeywell Inc., Minneapolis, Minn.

[21] Appl. No.: 652,970

[22] Filed: Jan. 28, 1976

[51] Int. Cl.$^2$ .................. G03B 27/76; G03B 27/54
[52] U.S. Cl. ........................................... 355/69; 355/70
[58] Field of Search .................. 355/67, 69, 70, 77, 355/80, 81; 354/354; 346/109; 96/45.2

[56] References Cited

U.S. PATENT DOCUMENTS

| | | | |
|---|---|---|---|
| 2,306,666 | 12/1942 | Simmon | 355/70 |
| 3,063,350 | 11/1962 | LeMassena | 96/45.2 |
| 3,225,353 | 12/1965 | Erickson | 346/109 |
| 3,462,221 | 8/1969 | Tajima et al. | 355/77 |
| 3,818,496 | 6/1974 | Lee et al. | 355/67 X |

Primary Examiner—Stephen J. Tomsky
Assistant Examiner—William B. Perkey
Attorney, Agent, or Firm—L. J. Marhoefer; L. D. Burton

[57] ABSTRACT

A latensifier for developing latent images recorded on direct print paper includes a pair of generally U-shaped fluorescent lamps mounted to expose the paper to latensifying radiations, the planes of said lamps being disposed at a right angle to each other, with a neutral density step filter arranged in association with one of the lamps to control pre-conditioning radiation to the paper, reflectors operatively associated with the second of the lamps to control additional pre-conditioning radiation to the paper and also to allow maximum use of the second lamp for recorded image development, the second lamp being selectively energized in accordance with the speed of relative movement of the lamps and paper.

6 Claims, 6 Drawing Figures

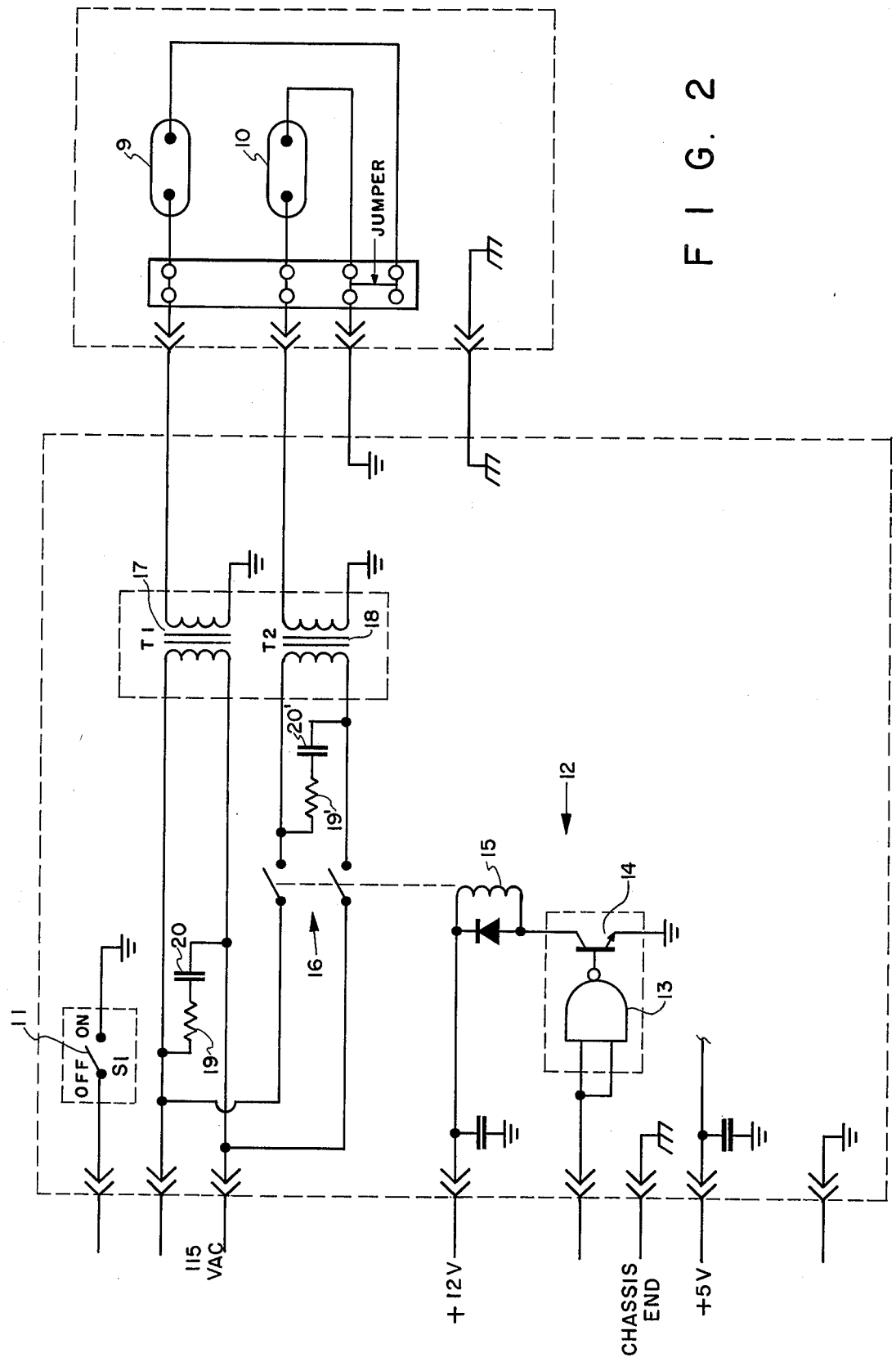

LATENSIFYING APPARATUS

BACKGROUND OF THE INVENTION

1. Field of the Invention

This invention relates to the field of recording on photosensitive direct print recording media or paper, and more specifically, to apparatus for latensifying images which have been recorded on such media thereby to provide rapid access to the recorded information.

2. Description of the Prior Art

Recording media or paper which have on one surface an emulsion which is sensitive to invisible radiations, for example, radiations in the ultraviolet region, are known. The emulsions of such photographic papers may have a variety of compositions, the basic constituents usually consisting, however, of a silver halide compound in a matrix of gelatin. Typical of such commercially available papers are the direct print papers sold by Eastman Kodak Company under the trade designations "Kodak 2167" and "Kodak LDP".

It is also known in the prior art to render visible images recorded on the emulsion of such photographic papers by chemical treatment or exposure to radiation of low energy or intensity. Such intensification of the latent image is referred to as latensification. Thus, it has been proposed in the prior art to effect latensification of direct print recording media by first subjecting the emulsion having the latent image to heat and thereafter exposing the emulsion for an interval to radiations within the band of wavelengths to which the emulsion primarily is sensitive. Such a latensifying arrangement is illustrated in U.S. Pat. No. 3,143,940 of R. P. Brown et al, issued Aug. 11, 1964. In another prior art arrangement, as illustrated in U.S. Pat. No. 3,229,299, R. D. Erickson dated Jan. 11, 1966, heat is not employed. The latensification there is effected by successively exposing the emulsion having the latent image first for a short time to a low intensity state of radiation having wavelengths to which the emulsion is primarily responsive, and thereafter, to a high intensity latensifying radiation having the same wavelengths.

Producing a visible record on direct print or photodeveloped recording media thus requires a period of exposure to radiation of substantially the same wavelengths as those to which the emulsion is primarily sensitive. Where the recording speed is substantially constant, such latensification is effective to provide rapid access to the recorded information. For those recording applications where the recording speed is variable, however, the period of exposure required for latensification results in significant disadvantage particularly when rapid access to or an immediate view of the recorded data is desired.

SUMMARY OF THE INVENTION

Among the objects of the present invention is the provision of an improved apparatus for latensifying recorded images on direct print or photodeveloped recording media which results in an immediate view of the recorded data over a wide range of recording speeds.

A particular object of the invention is to provide an improvement in such latensification apparatus whereby automatic control of the initially low and subsequently higher latensifying radiation energy is provided as required to compensate for the variations in exposure time resulting from changes in recording speed.

A move specific object of the invention is to provide such a configuration of the latensifying radiation source as to maximize efficient use of the recording media, the fixed exposure area, and the packaging space.

Another object of the invention is to provide an assembly or structure for latensifying apparatus of an oscillographic hard copy recorder, which structure is characterized by its interchangeability in the space provided in the recorder with another structure providing a chemical or wet processing latensifying capability.

In accomplishing these and other objects, the apparatus of the present invention departs from the techniques employed in the prior art by providing a plurality of selectively activated sources of latensifying radiation to which a number of different portions of said recording media are arranged to be exposed during the relative movement of said media and sources. The said sources provide radiation of the same wavelength band as that of the primary recording radiation of the oscillograph and are arranged for selective energization in accordance with the speed of said relative movement. Specifically, the arrangement is such as to project latensifying radiations of different energy levels or intensities on the different portions of the recording media and to vary said intensities in an inverse manner with respect to the time of exposure to said sources. Thus, automatic control of the latensifying radiation energy to compensate for variations in exposure time is provided whereby an immediate view of the recorded information is obtained over a wide range of recording speeds.

A feature of the present invention is the means provided to control the initial application of latensifying radiation of relatively low energy to said recording media at different recording speeds. The apparatus arrangement further is characterized in its efficient or maximized use of the latensifying space and the fixed exposure area of the recording media, and also interchangeability of the basic structure with a chemical or wet processing capability.

BRIEF DESCRIPTION OF THE DRAWINGS

A better understanding of the present invention may be had from the following detailed description when read in connection with the accompanying drawings wherein:

FIG. 2 is an electric circuit diagram illustrating the means for selectively energizing the latensifying radiation sources of the apparatus of FIG. 1;

DESCRIPTION OF THE PREFERRED EMBODIMENT

Figure 1:
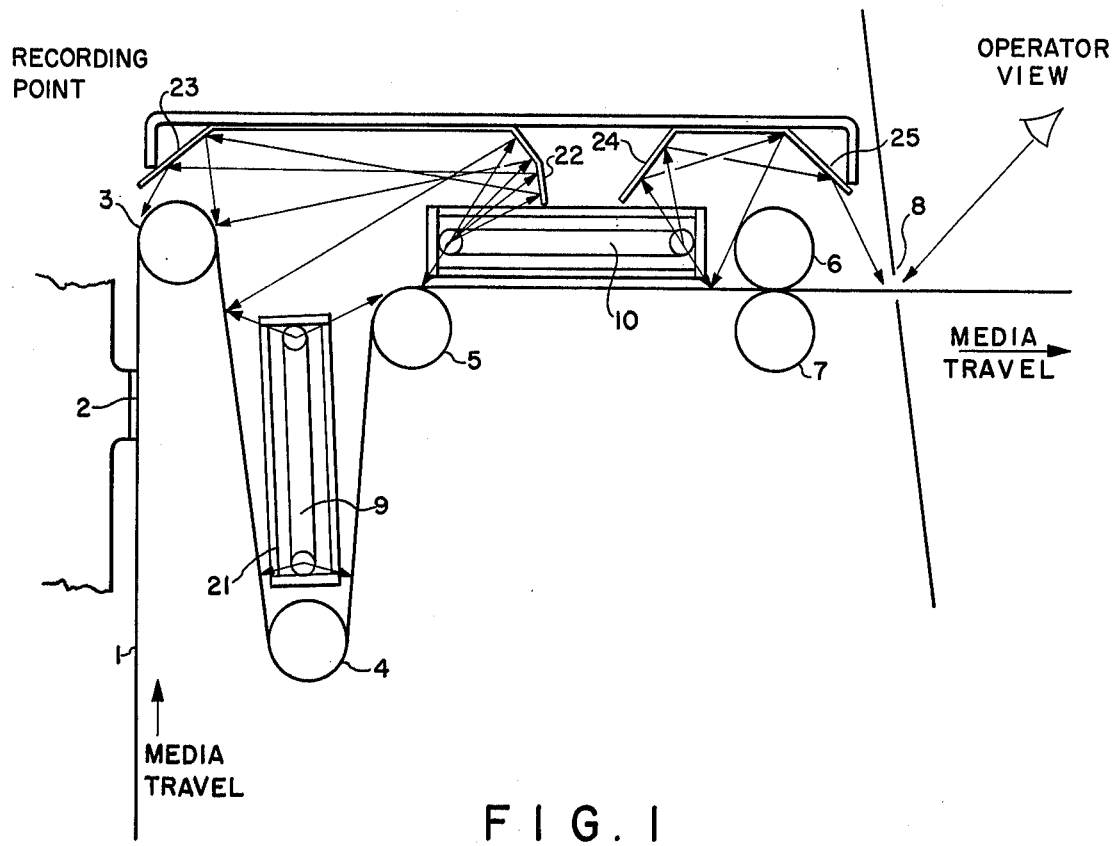
FIG. 1 is a diagrammatic or schematic view in vertical cross-section of the latensifying apparatus assembly according to the present invention.

The latensifying assembly illustrated in FIG. 1 includes a recording media 1 that is movable from a supply reel, not shown, in an upward directions past a recording plane or region 2, over guide rollers 3, 4 and 5, and between a pair of additional rollers 6 and 7 to an exit plane or region 8 of the apparatus. The roller 7 is a drive roller and is actuated by an electric motor, not shown, of the oscillographic recorder whereby the recording media is drawn through the latensifying apparatus from the supply reel and is permitted to spill out over the table or panel on which the apparatus is mounted. The guide rollers 3, 5 and 7, in a practical and operative embodiment of the invention, form part of the hard copy recording apparatus associated with an oscillograph. The rollers 4 and 6 comprise part of the latensifying assembly.

In the recording plane or region 2, the recording media 1 is exposed to a recording beam of radiation. That recording beam may be directed to the recording plane by a plurality of light deflecting galvanometers of the oscillograph, which may be of the type disclosed, for example, in U.S. Pat. No. 3,066,299, R. S. Kampf dated Nov. 27, 1962; or said radiation may be derived from the electron beam of a cathode ray tube oscillograph, as disclosed, for example, in U.S. Pat. No. 3,605,109, P. R. Lowe and T. N. Tyler, dated Sept. 14, 1971. One side of the recording media 1 is coated with a photographic emulsion having a primary sensitivity to the wavelengths present in the recording beam. Those wavelengths desirably are principally in the invisible portion of the spectrum. The matching of a recording beam with a recording media or paper coated with an emulsion primarily responsive to the radiation of the beam, permits the recording of multiple high, as well as low, frequency phenomena. As recorded, the image produced on the recording medium is not visible and is termed a latent image. Upon latensification, the latent image becomes visible in ordinary room light as the recording media comes out of the latensifying apparatus at the exit plane 8.

In the form of the invention illustrated in FIG. 1, radiation produced by electric lamp 9 or by electric lamps 9 and 10, selectively, operates to latensify the latent images on the recording media 1 as the latter is transported through the latensifying apparatus. Lamps 9 and 10 are controlled by an on-off switch 11, as seen in FIG. 2. Switch 11 desirably may be provided on a panel associated with the latensifying apparatus or on the front of the associated oscillograph. Lamp 10 additionally is controlled by a circuit shown at 12 in FIG. 2. The input to the circuit 12 comprises a sensor, not shown, that provides a signal representative of of the speed at which the recording media 1 moves past the recording plane. When that speed exceeds a predetermined value, for example, 2 inches/second (5 cm/sec), a NAND gate 13 and transistor 14 respond to close an energizing circuit to a relay 15 from a 12 volt source of direct current. Circuit 12 includes a double pole, single throw switch 16 which is connected in the energizing circuit to lamp 10. Energizing current for the lamps 9 and 10 is provided from a 115 volt alternating current source. Suitable ballast transformers 17 and 18 are provided in the energizing circuit, with a respective resistor 19, 19' and a capacitor 20, 20' connected in series for power factor correction across the primary winding of each transformer, as shown. The relay 15 is operatively arranged to close the switch 16 when the speed of movement of the recording media 1 past the recording plane or region 2 exceeds said predetermined value. As a result, for the lower recording speeds, lamp 9 is energized, but at the higher recording speeds, the lamp 10 also is energized.

As illustrated in FIG. 1, each of the lamps 9 and 10 comprise a fluorescent tube of generally U-shaped configuration, providing peak energy at 4600 and 5800 Angstroms (cool white). In an operative embodiment of the invention, the lamps 9 and 10 each comprised a type H 1639 manufactured by Aristo Grid Lamp Products, Inc. Other similar types of lamps may be employed, if desired.

For extremely rapid latsenification, it is important in the apparatus embodiment illustrated that the direct rays of neither lamp 9 and 10 should strike the recording media nearer than approximately 8.5 inches (21.6 cm) past the recording plane. In this region, approximately 8.5 inches from the recording plane, the recording media should be exposed only to ambient or indirect light containing a low intensity of radiations to which the paper is particularly sensitive. The ultraviolet radiation from lamps 9 and 10 thus should not strike the recording media 1 until the latter has been exposed first to ambient or indirect light.

Stated differently, a key requirement for developing direct print recording media is initial exposure to low level ultraviolet light for so-called pre-conditioning, that is, background to image or trace density contrast fixation. This pre-conditioning must occur subsequent to recording of the latent image on the media and prior to developing the latent image with high level radiation. Such development and pre-conditioning requires compensation of exposure time versus incident radiation energy.

In the apparatus of the present invention, the active components are mechanically fixed while the exposure time of the recording media to radiation from said lamps is variable, due to changes in travel speed of the recording media. Compensation for the exposure time variable is accomplished by using one fluorescent lamp as the latensifying radiation source when recording at the slower speed ranges, for example, in the ranges of 1 mm/second to 50 mm/second. The recording media speed responsive automatic switching arrangement illustrated in FIG. 2 activates the second fluorescent lamp 10 at the higher recording speeds.

Figure 4:
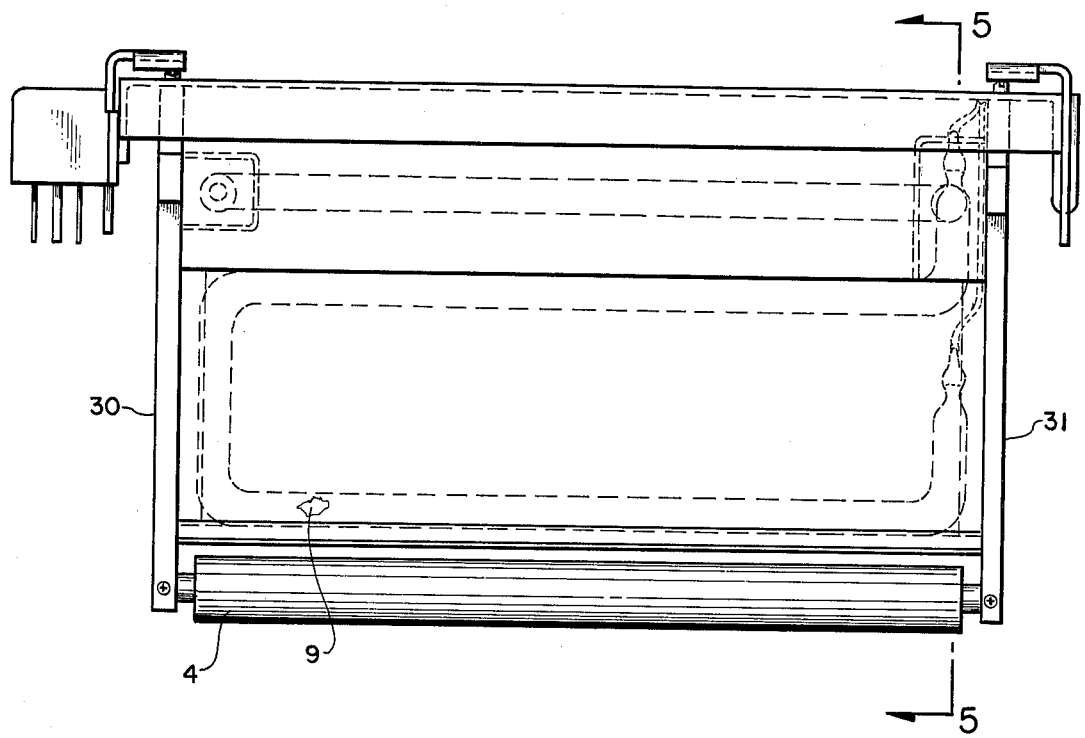
FIG. 4 is a front elevation of the latensifier apparatus of FIG. 1.
Figure 5:
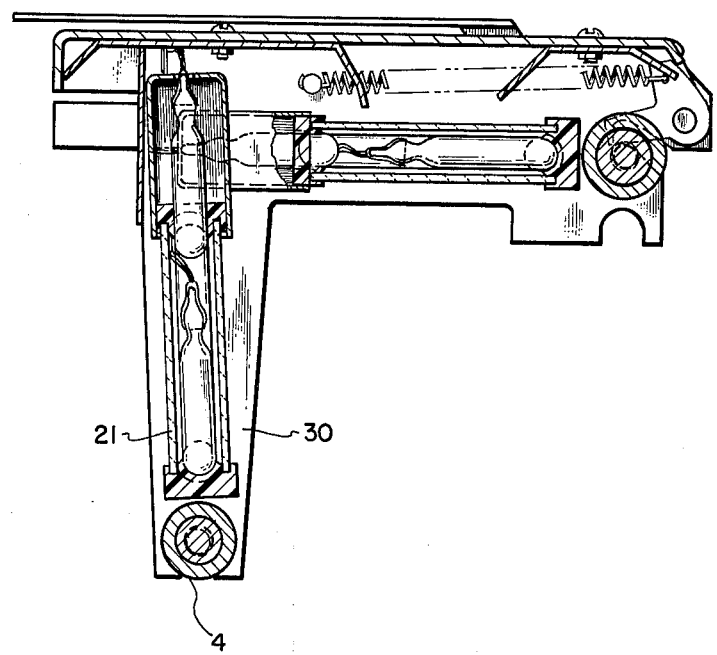
FIG. 5 is a side elevation of said apparatus.

The latensifier structure as seen in the front and side elevations of FIGS. 4 and 5, respectively, is adapted for insertion in the chassis of an oscillograph providing a hard copy readout capability. The configuration is so designed as to be interchangeable with a structure having the same general external outline and dimensions but including a tank containing a photodeveloping liquid for providing wet chemical treatment or processing of the recording media 1 for latensification purposes.

Figure 6:
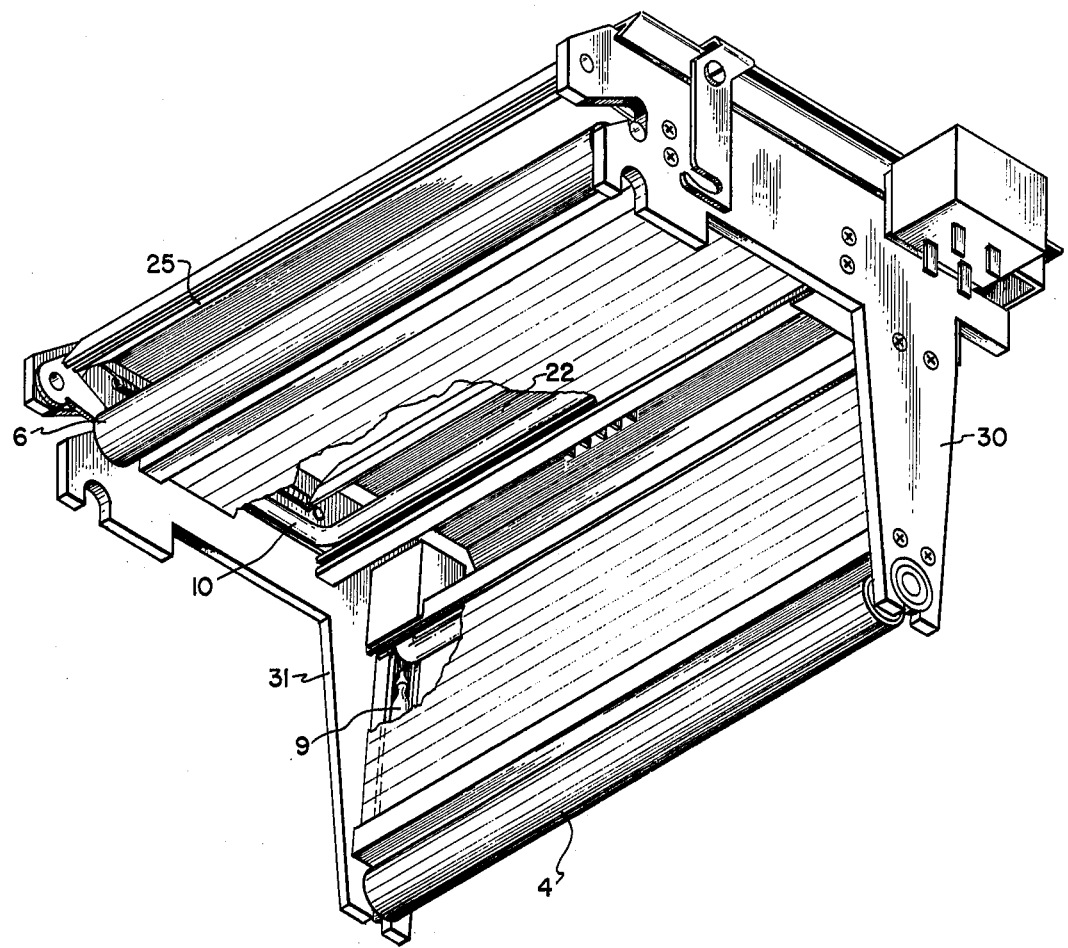
FIG. 6 is a perspective view of a portion of the apparatus assembly showing the latensifying radiation lamps.

As seen in FIGS. 4, 5 and 6, the latensifying assembly includes side plates 30 and 31 between which the guide rollers 4 and 6, the electric lamps 9 and 10, and the filter 21 are suitably supported. FIG. 4 shows the latensifying assembly facing the recording media input region of the hard copy recorder of the associated oscillograph. The lamp 9 is seen in dotted outline. The filter 21 generally fills the inner area defined by the lamp 9 outline. This area is the effective filtered light area for the recording media 1 as the latter is moved downwardly past the filter. On the other side of the lamp 9, and also underneath the lamp 10, a plastic, translucent, diffusion panel is provided. FIG. 6 provides a view of the development light area from underneath the latensifier assembly with the said diffusion panels shown partially cut away.

Figure 3:
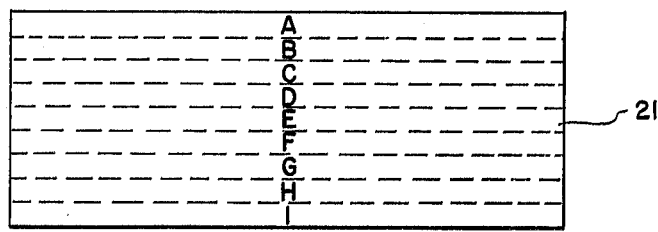
FIG. 3 is a front view of the neutral density step filter employed in the apparatus of FIG. 1.

The pre-conditioning requirement is met in the apparatus of FIG. 1 by passing the latensifying radiation from lamp 9 through a neutral density step filter 21. As seen in FIG. 1, filter 21 is disposed between the lamp 9 and the coated emulsion of the recorded media 1 as the latter moves along its transport path between the rollers 3 and 4. The step filter is characterized, as illustrated in FIG. 3, and as further described herein, to provide initially low and then progressively stepped increased amounts of energy to portions of the emulsion coating of the recording media as said portions move down past lamp 9 in said transport path. As said portions move around the other side of lamp 9 and upward toward roller 5, the radiation energy directly falls on said portions and is at a higher level. That is, there is no intervening filter in this region. For slow recording speeds, final development of the latent image takes place as the recording media passes from roller 4 to roller 5.

In an operative embodiment of the invention, the neutral step filter 21 is provided with nine steps designated A through I, as seen in FIG. 3 of the drawing. The filter is supported in a vertical position intermediate the lamp 9 and and the coated emulsion on recording media 1 with the step designated A closest to the roller 3. The letter designations are not marked on the filter but are provided for purposes of illustration only. Additionally, the said letter designations refers to the nine neutral density steps as specified in the following table:

| STEP DESIGNATION | NEUTRAL DENSITY +20% |
| --- | --- |
| A | 2.50 |
| B | 0.65 |
| C | 0.55 |
| D | 0.45 |
| E | 0.35 |
| F | 0.25 |
| G | 0.15 |
| H | 0.05 |
| I | 2.00 |

The dimensions of the filter employed in said operative embodiment are 7.52 inches (19.00 cm) wide, 2.83 inches (7.20 cm) high and 0.009 inches (0.024 cm) thick. Each of the steps A through I is 0.31 inches (0.80 cm) high. Size, shape and densities may be configured, as those skilled in the art understand, to optimize performance and packaging in other apparatus embodiments of the invention.

The distance of 8.5 inches (21.6 cm) from the recording plane to full intensity exposure mentioned previously is unique to the apparatus embodiment illustrated. Time of exposure to low level radiations is a more definitive requirement. Thus, a minimum of one (1) second exposure to pre-conditioning radiations is required when using the filter. This minimum is provided at maximum paper speed, in the illustrated embodiment, of 200 mm/second. Appropriate changes in the distance specified would be required on other devices incorporating higher paper speeds.

When recording in the higher media speed ranges, additional low energy level of ultraviolet radiation for preconditioning is projected on the recording media emulsion coating from the second fluorescent lamp 10 by means of reflectors 22 and 23. Because of the longer length of the optical path from lamp 10 to the recording media by way of reflectors 22 and 23, the energy or intensity of the radiation falling on the recording media by these paths is at a low level. Reflector 22, as shown in FIG. 1, is bent, and hence, provides low level latensifying radiations to the coated emulsion of recording media 1 across the top of roller 3 and a somewhat greater, although still low, level of energy over the portion of the media extending from roller 3 to the latensifying lamp 9 and filter 21. The level of energy provided to the media over the length of the filter 21 continues to increase, as previously noted.

The lamp additionally provides radiation energy at a higher level as the recording media moves along its transport path between roller 5 and rollers 6 and 7. Further, reflectors 24 and 25 are provided to project additional latensifying radiation from lamp 10 to the recording media as the latter moves in its transport path beyond the lamp 10 and the rollers 6 and 7. This additional radiation is at a lower level than that between rollers 5 and 7 because of the longer radiation path.

The lamp 9 which, for convenience, is termed a primary radiation source, is active at all drive speeds of the recording media in its transport path. The lamp 10 which, for convenience, is termed a secondary light source, is switched on automatically at the higher recording speeds. Thus for the higher recording speeds, final development of the latent image on the recording media takes place as the latter passes from roller 5 in its transport path. For higher recording speeds, the reflectors 22 and 23 provide additional low level radiation for preconditioning, and the reflectors 24 and 25 allow maximum use of the lamp 10 for final development.

Thus, there has been provided, in accordance with the present invention, an assembly of apparatus for latensifying images which have been recorded on direct print recording media or paper. That apparatus comprises a first means to expose portions of said recording media to primary latensifying radiations of successively increasing intensity, and second means selectively operable to expose other portions of said recording media to secondary latensifying radiations of successively increasing intensity simultaneously with the exposure of the said first portions by said first means. The apparatus is further characterized in the use of a neutral density step filter in association with said means to provide stepped increases in the level of said primary latensifying radiations.

A further significant characteristic of the latensifying apparatus assembly is the provision of a pair of generally U-shaped lamps for providing the primary and secondary radiations, with the planes of said lamps disposed substantially at a right angle with each other. As a result, there is obtained with said latensifying apparatus efficient use of the recording media, the fixed exposure area thereof, and the packaging space. Additionally, there is provided an assembly or structure that is suitable for interchange in an oscillographic hard copy recorder with another assembly or structure of generally similar outline providing a chemical or wet processing latensifying capability.

The embodiments of the invention in which an exclusive property or privilege is claimed are defined as follows:

1. Apparatus for latensifying images which have been recorded on direct print media comprising first and second sources of latensifying radiation, said first source being operable to expose a first transverse portion of said direct print media at a first linear position thereof, and means associated with said second source and selectively operable in an on/off mode to expose other transverse portions of said direct print media at different positions linearly displaced with respect to said first transverse portion and simultaneously with the exposure of said first portions by said first source.

2. Apparatus for latensifying images which have been recorded on direct print media comprising first and second sources of latensifying radiation, said first source being operable to expose first portions of said direct print media at a first linear position thereof, and means associated with said second source and selectively operable to expose other portions of said direct print media at different linear positions thereof and simultaneously with the exposure of said first portions thereof by said first source, said recording media being movable relative to said sources of latensifying radiation and including further means associated with said second source to direct said radiation to said other portions of said direct print media wherein, with respect to said direction of movement of said media, a first part of said other portions of said media is positionally ahead of said first portions and a second part of said other portions is positionally after said first portions.

3. Apparatus for latensifying images which have been recorded on direct print media comprising first means to expose said direct print media to latensifying radiations, said recording media being linearly movable at a first and a second range of speeds relative to said first means, and second means associated with said first means and selectively operable in accordance with the range of speeds of said relative movement to vary the energy level of latensifying radiations to which said recording media is exposed.

4. Apparatus for latensifying images which have been recorded on direct print media comprising first and second sources of latensifying radiation to which said direct print media is adapted to be exposed, said direct print media and said first and second sources being relatively movable and means selectively to energize at least one of said sources in accordance with the speed of said relative movement, whereby to vary the energy of the latensifying radiation to which said direct print media is exposed in accordance with the exposure time of said direct print media to said sources, and further means for directing latensifying radiations to said direct print media prior to and subsequent to the exposure portion of said direct print media to said first-mentioned source of latensifying radiation.

5. Apparatus as specified in claim 4 including a radiation filter interposed between said first-mentioned source of radiation and said direct print media, said filter having a decreasing density in the direction of movement of said direct print media relative to said source whereby any portion of said material is exposed to progressively increasing latensifying radiations as said portion moves relatively to said filter.

6. Apparatus as specified in claim 5 wherein said first and second sources of latensifying radiation are in the form of U-shaped tubes and are disposed substantially at a right angle to each other.

* * * * *